(12) United States Patent
Segev et al.

(10) Patent No.: US 7,830,594 B2
(45) Date of Patent: Nov. 9, 2010

(54) METHOD AND APPARATUS FOR ELECTRO-OPTICAL AND ALL-OPTICAL BEAM STEERING, SELF-DEFLECTION AND ELECTRO-OPTIC ROUTING

(75) Inventors: Mordechai Segev, Haifa (IL); Sharon Shwartz, Beit Hillel (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 11/091,925

(22) Filed: Mar. 29, 2005

(65) Prior Publication Data
US 2006/0227410 A1    Oct. 12, 2006

(51) Int. Cl.
*G02F 1/00*    (2006.01)
(52) U.S. Cl. .................. 359/321; 359/318; 359/324
(58) Field of Classification Search .................. 359/321, 359/237, 313, 318–322, 324
See application file for complete search history.

(56) References Cited

U.S. PATENT DOCUMENTS

| | | | | | |
|---|---|---|---|---|---|
| 4,773,739 A | * | 9/1988 | Valley et al. | ................. | 359/300 |
| 5,303,032 A | * | 4/1994 | Uesu et al. | .................. | 356/457 |
| 5,377,176 A | * | 12/1994 | Redfield | ...................... | 369/103 |
| 6,512,385 B1 | * | 1/2003 | Pfaff et al. | ................... | 324/753 |

OTHER PUBLICATIONS

Kaplan, "Bending of Trajectories of Asymetrical Light Beams in Nonlinear Media", Institute of Radio Engineering and Electronics, USSR Academy of Sciences, ZhETF Pis. Red. 9, 58-62, Jan. 5, 1969, pp. 33-36.
Friedrich et al., "Dynamic, Electronically Controlled Angle Steering of Spatial Solitons in AIGaAs Slab Waveguides", Optics Letters, vol. 23, No. 18, Sep. 15, 1996, pp. 1438-1440.
Yeriv, "Optical Electronics in Modern Communications", 5th Ed. (Oxford University Press, New York, 1997), pp. 353-356.
Shwartz et al., "Self-deflection and all-optical beam steering in CdZnTe", Optics Letters, vol. 29, No. 7, Apr. 1, 2004, pp. 760-762.

* cited by examiner

*Primary Examiner*—Scott J Sugarman
*Assistant Examiner*—Brandi N Thomas
(74) *Attorney, Agent, or Firm*—Pearl Cohen Zedek Latzer, LLP

(57) ABSTRACT

An apparatus for all-optical deflection of an incident optical signal beam, the apparatus comprising: a photorefractive semiconductor crystal; and an electric field source, for applying an electric field across the crystal either through electrodes or by positioning the crystal at a place where an electric field is present. In another embodiment of the invention a second optical beam source, for illuminating the crystal with a background optical beam. The apparatus is used for steering the signal beam, lensing it or for other applications.

11 Claims, 8 Drawing Sheets

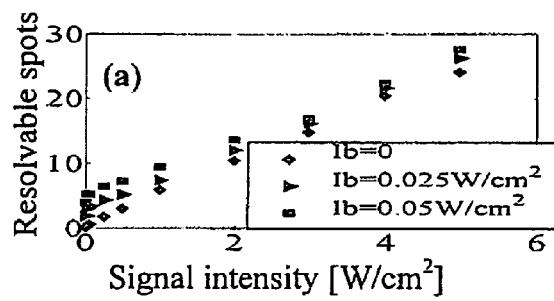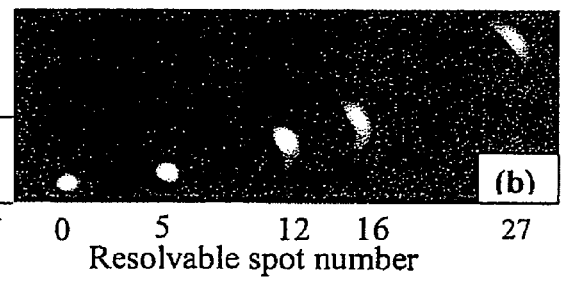
FIG. 2a  FIG. 2b
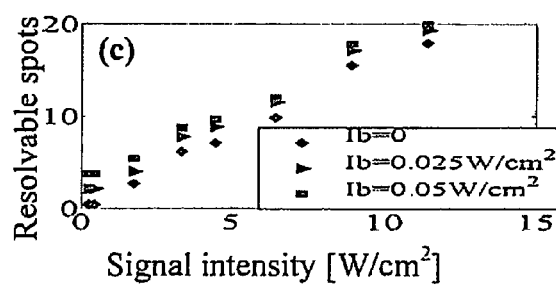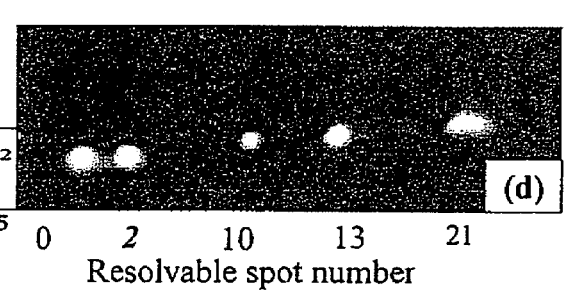
FIG. 2c  FIG. 2d
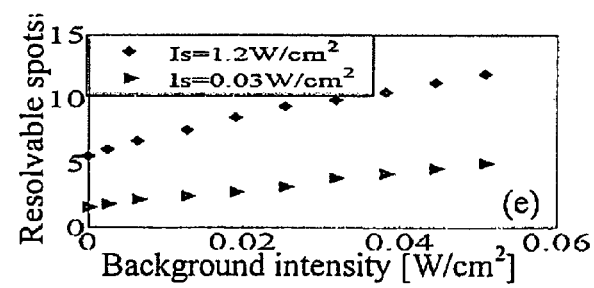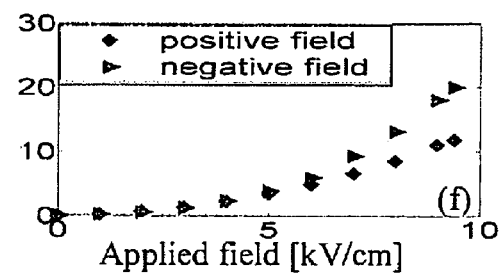
FIG. 2e  FIG. 2f

METHOD AND APPARATUS FOR ELECTRO-OPTICAL AND ALL-OPTICAL BEAM STEERING, SELF-DEFLECTION AND ELECTRO-OPTIC ROUTING

FIELD OF THE INVENTION

This invention relates to optical beam steering and deflection. In particular, it relates to a system and a method for beam self-deflection, all-optical beam steering (i.e., steering one beam by varying the intensity of another beam), and electro-optic beam deflection. The method relies on using a proper combination of light and bias field to enhance the optical nonlinearity in a photorefractive semiconductor and consequently to modulate, steer, and deflect an optical beam by light, electricity, or both.

BACKGROUND OF THE INVENTION

Since its early prediction by A. E. Kaplan (Pis'ma Zh. Eksp. Teor. Fiz. 9, 58 (1969) [JETP Lett. 9, 33 (1969)]), self-deflection of optical beams has been considered one of the most exciting manifestations of nonlinear optics: a single beam propagating in a nonlinear medium develops an asymmetric profile and consequently curves (and carves) its own trajectory. The beam intensity determines the beam trajectory.

If self-deflection had been accomplished with low power levels, fast response times, and many resolvable spots, this fascinating process would have already found its way into commercial products, in applications ranging from optical interconnects to laser printers, optical scanners, routers, and optical limiters. Unfortunately, experimental demonstrations of self-deflection of optical beams have been scarce, exhibiting very few resolvable deflection spots. A resolvable spot of deflection is defined as the deflection angle divided by the diffraction angle of the finite beam.

Thus far, self-deflection has been demonstrated in NaCl and CdSSe crystals, liquid CS2, sodium vapor and nematic liquid-crystal films.

In all of these attempts at self-deflection, the number of resolvable spots was small: typically 2-3, with the exception of sodium vapor, which had 8. Furthermore, all of these experiments required high intensities, ranging from 200 W/cm$^2$ in sodium to 400 MW/cm$^2$ in NaCl. All of these early demonstrations of self-deflection suffered from major distortions of the beam profile, which limited the deflection angle.

By contrast, the present invention provides very large self-deflection of optical beams. The self-deflection arises from enhanced photorefractive effects in photorefractive semiconductors. For example, CdZnTe:V (Cadmium Zinc Tellurium doped with Vanadium) has been shown to result in up to 27 resolvable deflection spots at 1 Watt/cm$^2$ intensity, more than 3 times the resolvable spots than in any reported prior art self-deflection results, and at 200 times lower intensity.

These deflections arise from enhanced photorefractive effects in photorefractive semiconductors, giving rise to optically-induced index changes, typically in excess of 0.008.

The index change highly depends on the intensity of the deflected beam, hence the self-deflection. The deflection can be controlled through the intensity of a second ("background") beam at a different wavelength, thereby the process also allows for all-optical control of one beam with another. The deflection can also be controlled through the bias electric field applied to the crystal, thus the same process also facilitates electro-optic deflection. However, in a sharp contradistinction with "traditional" electro-optic deflection yielding 1-5 resolvable spots, our process yields more than 25 spots. In principle, our self-deflection technique can be further improved to facilitate more than 100 resolvable spots (see details below).

Another advantage of the present invention is that, in contrast to prior art, the deflected beam has a symmetric (circular) structure throughout almost the entire deflection range.

In summary, it is a main object of the present invention to provide a system and method for self-deflection of an optical beam (where modifying the intensity of the beam varies the beam trajectory).

It is another main object of the present invention to switch and deflect one beam by varying the intensity of another beam (all-optical beam steering).

It is another main object of the present invention to provide control of the deflection by varying the level of electrical bias.

All of these methods of deflecting, steering, controlling, and modulating optical beams rely on using a proper combination of light and bias field to enhance the optical nonlinearity in a photorefractive semiconductor and consequently modulate, steer, and deflect an optical beam using light, electricity, or both.

Other objects and advantages of the present invention will become apparent after reading the present specification and reviewing the accompanying drawings.

BRIEF DESCRIPTION OF THE INVENTION

There is thus provided an apparatus for all-optical deflection of an incident optical signal beam, the apparatus comprising:
  a photorefractive semiconductor crystal; and
  an electric field source, for applying an electric field across the crystal either through electrodes or by positioning the crystal at a place where an electric field is present.

Furthermore, in accordance with some preferred embodiments of the present invention, the electrodes comprise a pair of electrodes.

Furthermore, in accordance with some preferred embodiments of the present invention, the electrodes comprise two pairs of electrodes, for applying electric fields of opposite polarities.

Furthermore, in accordance with some preferred embodiments of the present invention, the electrodes have a predetermined shape.

Furthermore, in accordance with some preferred embodiments of the present invention, the electrodes are triangular.

Furthermore, in accordance with some preferred embodiments of the present invention, the electrodes are in the form of plates with a curved edge.

Furthermore, in accordance with some preferred embodiments of the present invention, the electrodes comprise an electrode array.

Furthermore, in accordance with some preferred embodiments of the present invention, the period of the electrode array is perpendicular to the propagation axis of the incident optical signal beam.

Furthermore, in accordance with some preferred embodiments of the present invention, the period of the electrode array is parallel to the propagation axis of the incident signal optical beam.

Furthermore, in accordance with some preferred embodiments of the present invention, the electrode array is arranged periodically.

Furthermore, in accordance with some preferred embodiments of the present invention, the wherein the electrodes are intertwined.

Furthermore, in accordance with some preferred embodiments of the present invention, the electric field source is variable, allowing modification of the electric field.

Furthermore, in accordance with some preferred embodiments of the present invention, the apparatus further comprises an optical beam source, for illuminating the crystal with a background optical beam.

Furthermore, in accordance with some preferred embodiments of the present invention, the optical beam source is variable, allowing modification of properties of the background optical beam.

Furthermore, in accordance with some preferred embodiments of the present invention, the optical beam source has variable intensity.

Furthermore, in accordance with some preferred embodiments of the present invention, the optical beam source has variable wavelength.

Furthermore, in accordance with some preferred embodiments of the present invention, the apparatus is further provided with at least one optical lens.

Furthermore, in accordance with some preferred embodiments of the present invention, the crystal comprises at least two parts, each part with different crystalline orientations.

Furthermore, in accordance with some preferred embodiments of the present invention, the crystal is selected from the group of crystals doped CdZnTe, doped InP, and doped GaAs.

Furthermore, in accordance with some preferred embodiments of the present invention, there is provided a method for self-deflection of an incident optical beam of a given intensity, the method comprising:
    providing a photorefractive semiconductor crystal in the path of the incident optical beam; and
    applying an electric field across the crystal either through electrodes or by positioning the crystal at a place where an electric field is present.

Furthermore, in accordance with some preferred embodiments of the present invention, there is provided a method for deflection of an incident optical beam, the method comprising:
    providing a photorefractive semiconductor crystal in the path of the incident optical beam;
    applying an electric field across the crystal either through electrodes or by positioning the crystal at a place where an electric field is present; and
    illuminating the crystal with a background optical beam of predetermined properties.

Furthermore, in accordance with some preferred embodiments of the present invention, the method further comprises controlling the intensity of the background beam.

Furthermore, in accordance with some preferred embodiments of the present invention, the method further comprises controlling the wavelength of the background beam.

Furthermore, in accordance with some preferred embodiments of the present invention, the method is used for creating a photonic lattice.

Furthermore, in accordance with some preferred embodiments of the present invention, the electrodes comprise a pair of electrode arrays aligned substantially parallel to the incident beam.

Furthermore, in accordance with some preferred embodiments of the present invention, the method is used for self-filtering of the incident beam.

Furthermore, in accordance with some preferred embodiments of the present invention, the electrodes comprise a pair of electrode arrays aligned substantially perpendicular to the incident beam.

Furthermore, in accordance with some preferred embodiments of the present invention, the method is used for creating optical lens effect.

Furthermore, in accordance with some preferred embodiments of the present invention, the electrode comprise a pair of plates with a curved edge.

Furthermore, in accordance with some preferred embodiments of the present invention, the curved edge is concave.

Furthermore, in accordance with some preferred embodiments of the present invention, the curved edge is convex.

Furthermore, in accordance with some preferred embodiments of the present invention, the method is used for providing an optical limiter.

Furthermore, in accordance with some preferred embodiments of the present invention, the method is used for optical switching.

Furthermore, in accordance with some preferred embodiments of the present invention, the method is used in an all-optical or electro-optical interconnect.

Furthermore, in accordance with some preferred embodiments of the present invention, the method is used for self-switching in a packet switching application.

Furthermore, in accordance with some preferred embodiments of the present invention, the method is used for optical scanning.

Furthermore, in accordance with some preferred embodiments of the present invention, the method is used for beam-steering.

BRIEF DESCRIPTION OF THE FIGURES

The invention is described herein, by way of example only, with reference to the accompanying figures, in which like components are designated by like reference numerals.

FIG. 2a is a graph of experimental self-deflection results for an exemplary system, plotting of number resolvable spots vs. the intensity of the deflected (signal) beam, for three values of background intensity, taken at $E_0$=4.5 kV/cm;

FIG. 2b is a photograph of the self-deflected beam of FIG. 2a with $I_b$=0.05 W/cm$^2$;

FIG. 2c is a graph of experimental self-deflection results for an exemplary system, plotting the number of resolvable spots vs the intensity of the deflected (signal) beam, for three values of background intensity, taken at 2 kV/cm;

FIG. 2d is a photograph of the self-deflected beam of FIG. 2c with $I_b$=0.05 W/cm$^2$;

FIG. 2e is a graph for an exemplary system, of the number of resolvable spots vs. the intensity of the background beam, for two values of the signal intensity, taken at $E_0$=2 kV/cm;

FIG. 2f is a graph for an exemplary system, of the number of resolvable spots vs. applied field for both negative and positive field polarities, taken at $I_s$=1.24 W/cm$^2$ and $I_b$=0.05 W/cm$^2$;

DETAILED DESCRIPTION OF THE INVENTION

A main aspect of the present invention is the provision of an apparatus for all-optical deflection of an incident optical beam, comprising a photorefractive semiconductor crystal, and an electric field source, for applying an electric field across the crystal through electrodes.

Another main aspect of the present invention is further providing an illumination source for illuminating the photorefractive semiconductor crystal with a background beam, for affecting and controlling the deflection of the incidental beam.

Another main aspect of the present invention is the provision of a method for self-deflection of an incident optical beam of a given intensity comprising providing a photorefractive semiconductor crystal in the path of the incident optical beam; and applying an electric field across the crystal through electrodes.

Yet another main aspect of the present invention is the provision of a method for deflection of an incident optical beam comprising providing a photorefractive semiconductor crystal in the path of the incident optical beam; applying an electric field across the crystal through electrodes; and illuminating the crystal with a background optical beam of predetermined properties.

Reference is now made to the figures.

Figure 1:
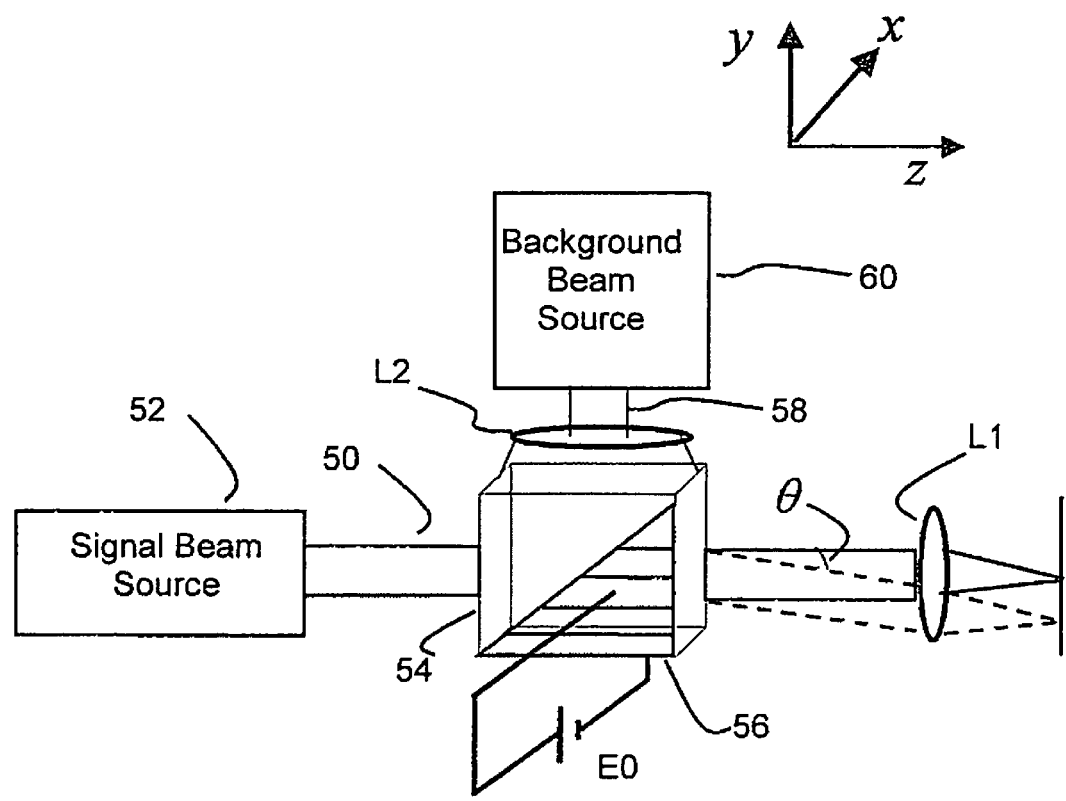
FIG. 1 illustrates a system for beam self-deflection through a photorefractive semiconductor based on applied electricity, light, or both in accordance with a preferred embodiment of the present invention.

FIG. 1 illustrates a system for beam self-deflection through a photorefractive semiconductor based on applied electricity, light, or both in accordance with a preferred embodiment of the present invention A "signal" beam 50 from signal beam source 52 with intensity (Is) is launched into crystal 54 and propagates along its <Z> direction. The preferred signal beam source 52 is a laser source but other beam sources may also be used, for example a light emitting diode (LED). The crystal 54 is a photoreactive semiconductor crystal. Examples of photoreactive semiconductors include doped CdZnTe (Cadmium Zinc Tellurium), doped InP (Indium Phosphate) crystal, or doped GaAs (Gallium Arsenide) crystal.

The signal beam wave front is tilted by crystal 54. The tilted output signal beam from crystal 54 is preferably captured by lens L1 that transforms the inclination angle of the wave front to deflection.

The two <X> faces of crystal 54 are connected to a non-uniform bias electric field E0 applied through electrodes 56. In the preferred embodiment shown in FIG. 1, electrodes 56 are substantially parallel right-angle triangles oriented so that signal beam 50 is incident on the electrode's hypotenuse (in other words: the electric field is applied across the crystal in an angle, preferably—but not necessarily—substantially perpendicular to incident beam). This electrode arrangement is similar to the scheme used for electro-optic steering of quadratic solitons [L. Friedrich, G. I. Stegeman, P. Millar, J. Hamilton, and J. S. Aitchison, Opt. Lett. 23, 1438 (1998)]. A preferred electrode configuration is two substantially equilateral 45 degree triangles.

With the system as described to this point, beam self-deflection can be achieved by varying the intensity of signal beam 50. Furthermore, electro-optic steering can be achieved by varying the intensity of the non-uniform bias electric field E0.

Another steering parameter can be added to the system by addition of a "background" beam 58 with intensity (Ib) from a second beam source 60 (characterized by different wavelength that the incident beam; the wavelength of which is determined by the absorption levels of the dopants in the crystal) and passing through lens L2 to uniformly illuminate crystal 58. The preferred background beam source 60 is a laser but another beam source can be used, for example a LED.

All-optical steering is achieved by varying the intensity of background beam 58, thereby controlling the deflection of signal beam 50.

When E0=0, the refractive index is uniform everywhere in the crystal, and signal beam 50 propagates "on axis". When E0>0, it modifies the refractive index of crystal 54. The index change at any point depends on the local field, which in turn depends on the signal 50 and background 58 intensities, and whether that point is between electrodes 56 or not (as in regions that are not between electrodes, E0=0).

Hence, the optical intensity and the bias field give rise to a prism-like index change, as the beam propagating in the crystal experiences a different refractive index (a different phase delay) at different "heights" in the <Y> direction. This tilts the beam wavefront by an angle θ, and deflects the beam. The number of resolvable deflection spots is given by $N=|\theta/\theta_{Beam}|$, where $\theta_{Beam}$ is diffraction angle of signal beam 50.

Therefore the deflection depends on three variables: the intensities of signal beam 50, background beam 58, and applied field E0. When the background 58 intensity and the applied field E0 are set anywhere in the appropriate parameter range, there is self-deflection of signal beam 50. The intensity of signal beam 50 alone determines its trajectory.

An exemplary system was built and tested (the arrangement as in FIG. 1) its details as follows: Broad signal beam 50 (0.8 mm FWHM—Full Width Half Maximum) from Ti:Sapphire laser 52 at 900 nm was launched into a 5 mm long crystal 54b, and propagated along its <Z> direction. Nonlinear crystal 54 was selected to be CdZnTe (1% Zn), doped with Vanadium at 1016 [$cm^{-3}$] concentration. The output beam was captured by a lens L1 (f=50 mm) and focused to an 11 micrometer full width at half maximum (FWHM) spot at focal plane of lens L1, from where it was imaged onto a charge-coupled device (CCD) camera. The temperature of the crystal was stabilized at 294K to control the density of its free charge carriers arising from thermal excitations. In addition to the self-deflected signal beam 50, the crystal was also illuminated uniformly by background beam 58 at 1527 nm wavelength from diode laser 60. The two <X> faces of crystal 54 were connected to a bias electric field applied through electrodes 56 in the form of equilateral 45 degree triangles covering two parallel halves of the crystal faces Typical experimental results for the exemplary system are shown in the Figures—FIG. 2a to FIG. 2f. FIG. 2b and FIG. 2d show photographs of the self-deflected signal beam for various signal beam intensities, taken with Ib=0.05 W/$cm^2$ and at E0=4.5 kV/cm and 2 kV/cm, respectively. Here the signal beam is polarized in the <Y> direction. Photographs FIG. 2b and FIG. 2d are taken at the focal plane of the output lens, where each resolvable spot is 11 micrometer FWHM and the maximum deflection is 304 micrometer, yielding 27 resolvable spots. Surprisingly, the deflection is in both transverse directions (in contrast to ordinary electro-optic beam deflection). In angular terms, the output beam is deflected up to 3.5 mrad, while the diffraction angle is 0.12 mrad. It is evident that this number of resolvable spots is much higher than any previously reported optical self-deflection. The maximum deflection is limited by distortion of the deflected beam, however, in contrast to all previous systems, here the beam is almost undistorted for at least the first 20 resolvable spots. FIG. 2a and FIG. 2c show the number of resolvable spots for the same E0 as in FIG. 2b and FIG. 2d, respectively, for three values of Ib. These figures indicate that the deflection angle depends linearly on the signal intensity Is, for the entire measurement range.

To this point the self-deflection of the signal beam has been addressed, yet the deflection may be affected by the intensity of a background beam 58. We therefore tested for all-optical deflection of signal beam 50 by varying the intensity (Ib) of background beam 58 while keeping E0 and Is unchanged. Typical results (taken with E0=2 kV/cm and two Is values) are shown in FIG. 2e, indicating that the deflection of the signal beam depends linearly on Ib. That is, the all-optical defection of a signal beam by another (background) beam is linear with respect to the intensity of the control beam, just as the self-deflection of a signal beam depends linearly on its own intensity. The third variable controlling the deflection is the applied field E0. We measured the deflection of the signal beam as a function of E0, while keeping Is and Ib fixed. The results are shown in FIG. 2f for Is=1.24 W/cm$^2$ and Ib=0.05 W/cm$^2$, respectively.

Figure 3:
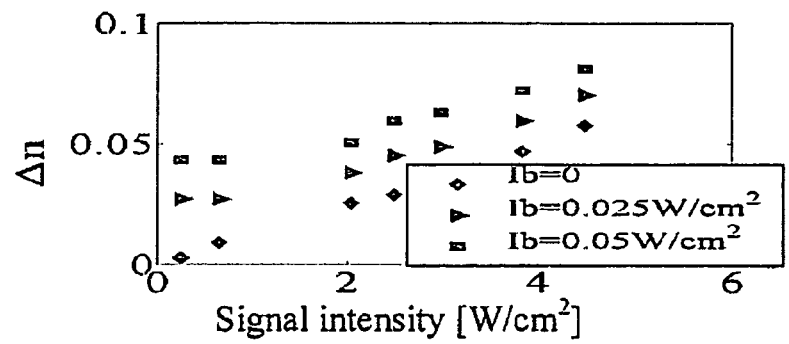
FIG. 3 is a graph for an exemplary system, of the electro-optic index change vs signal intensity for three values of background illumination, taken at $E_0$=4 kV/cm.

The large optical self-deflection of the signal beam relies on a very large Δn (the induced change in the refraction index of the crystal). One can deduce Δn from the deflection angle, but it is much more accurate to measure it interferometrically. We therefore constructed a Mach-Zender interferometer and positioned the nonlinear crystal in one of its arms. We illuminated the crystal uniformly with a very broad signal beam, set the values of Ib and $E_0$, and measured the shift of the interference fringes (at the interferometer output) as a function of Is. From the phase shift of the fringes, we find Δn directly, with no free parameters. The results are shown in FIG. 3, for three different values of Ib, with $E_0$=4 kV/cm, and they show a very large value of Δn: roughly 0.008. This is apparently the largest nonlinear index change ever measured in a bulk inorganic material.

Figure 4:
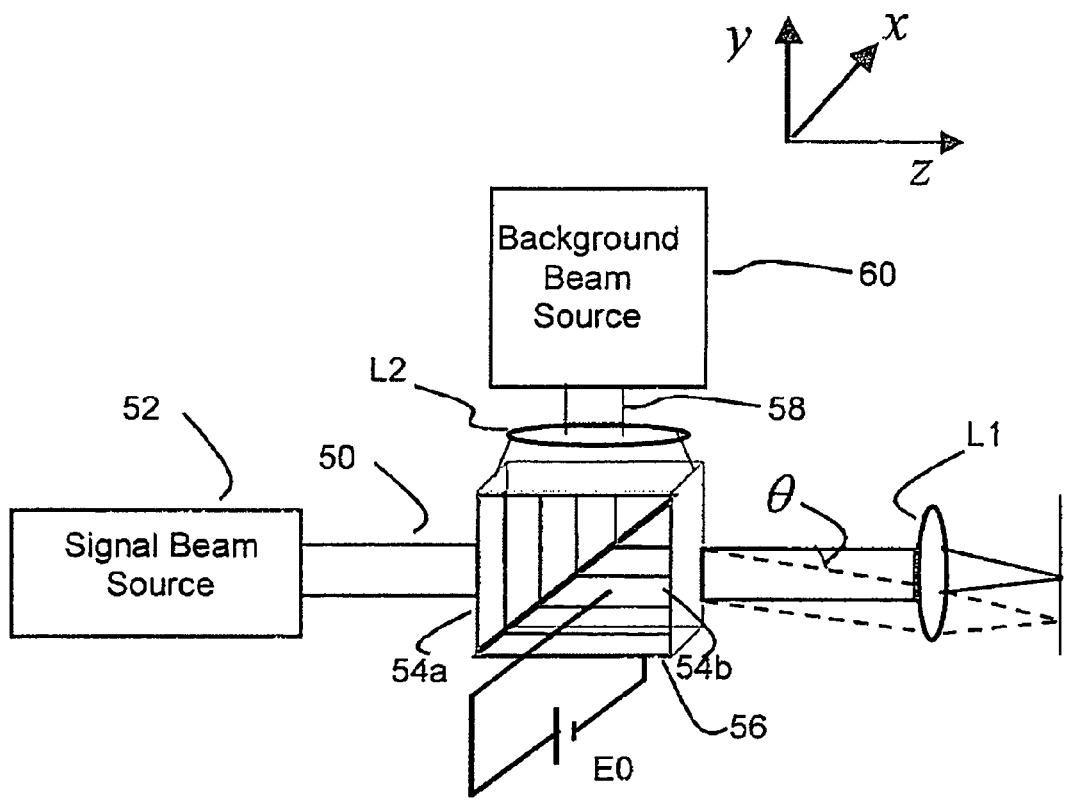
FIG. 4 illustrates a system for beam self-deflection through a photorefractive semiconductor composed of two parts in accordance with an alternative preferred embodiment of the present invention.

FIG. 4 illustrates a system for beam self-deflection a photorefractive semiconductor composed of two parts in accordance with an alternative preferred embodiment of the present invention.

A "signal" beam 50 from signal beam source 52 with intensity (Is) is launched into attached crystals 54a and 54b and is propagating along the Z direction.

The signal beam wave front is tilted by crystals 54a and 54b. The tilted output signal beam from crystals 54a and 54b is preferably captured by lens L1 that transforms the inclination angle of the wave front to deflection.

The two parts 54a and 54b of photorefractive crystal are attached in a way that one part creates positive change in the refractive index when an electric field, light or both are applied, while the other part creates negative change in the refractive index at the same time. (Similar to the scheme used for electro-optic deflector [A. Yariv, Optical Electronics In Modern Communications, 5th Ed. (Oxford University Press, New York, 1997), pp. 353].

In principle, the present invention suggests manipulating the refractive index of the crystal(s) thereby changing the optical path. In the embodiment of FIG. 1, the change in the refractive index is caused by the non-uniform bias electric field. In the embodiment of FIG. 4, the change is caused by the difference in the crystallographic direction of the two crystals 54a and 54b.

The steering is controlled by the same parameters (electric field strength, signal intensity, and background intensity) and method as in FIG. 1, but with larger deflection for the same parameters.

Figure 5:
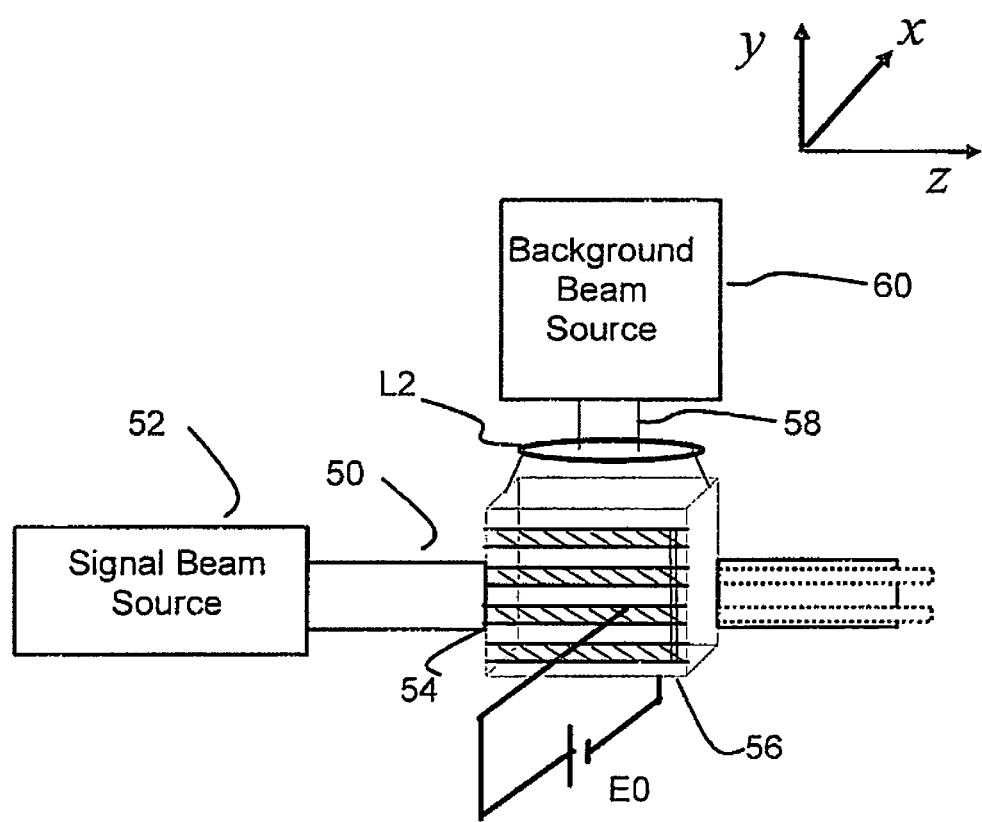
FIG. 5 illustrates a system for creating a periodic waveguide array (photonic crystal) by using electrode arrays on the surfaces of a photorefractive semiconductor in accordance with a preferred embodiment of the present invention.

FIG. 5 illustrates a system for creating a photonic lattice by using electrode arrays with a photorefractive semiconductor in accordance with another preferred embodiment of the present invention The two X faces of crystal 54 are connected to a non-uniform bias electric field E0 applied through an array of substantially parallel electrodes 56. The electrodes are arranged as a pair of electrode arrays aligned along the Z direction.

When E0=0, the refractive index is uniform everywhere in the crystal and signal beam 50 propagates in the Z direction. When E0>0, it modifies the refractive index of crystal 54. The index change at any point depends on the local field, which in turn depends on the signal 50 and background 58 intensities and whether that point is between electrodes 56 or not (as in regions that are not between the electrodes, E0=0).

Hence, the optical intensity and the bias field give rise to a periodic change along the Y direction in the refractive index and the beam propagating in the crystal experiences a different refractive index at different "heights" in the Y direction. The system behaves like an array of waveguides and the beam is trapped in the areas across the electrodes, thereby creating a photonic lattice.

Figure 6:
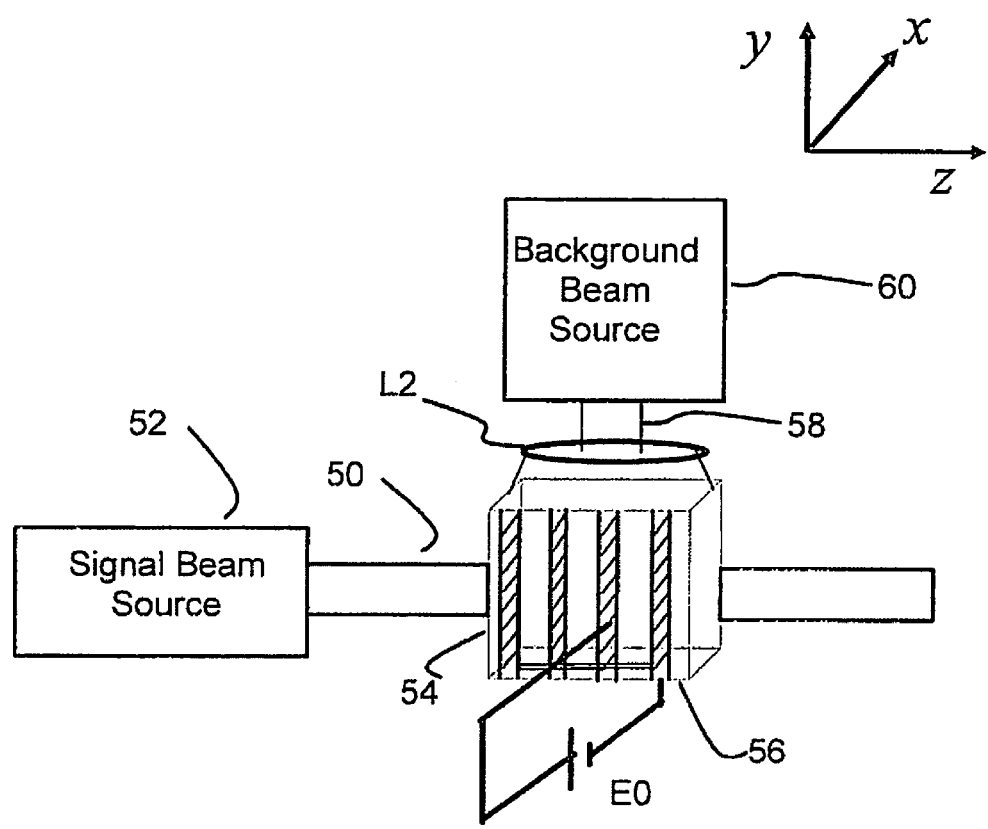
FIG. 6 illustrates a system for self-filtering of a beam through a photorefractive semiconductor in accordance with a preferred embodiment of the present invention.

FIG. 6 illustrates self-filtering of a beam using a photorefractive semiconductor crystal in accordance with a preferred embodiment of the present invention.

The two <X> faces of crystal 54 are connected to a non-uniform bias electric field E0 applied through electrodes 56. The electrodes are arranged in an array of electrodes along the Z direction.

When E0=0, the refractive index is uniform everywhere in the crystal and signal beam 50 propagates along the Z direction. When E0>0, it modifies the refractive index of crystal 54. The index change at any point depends on the local field, which in turn depends on the signal 50 and background 58 intensities and whether that point is between electrodes 56 or not (as in regions that are not between electrodes, E0=0).

Hence, the optical intensity and the bias field give rise to a periodic change along the Z direction in the refractive index and the beam propagating in the crystal experiences different refractive indices at different locations along the propagation axis. If this beam is of a specific wavelength than the period index modulation will cause efficient backscattering. On the other hand, if the beam is at a different wavelength, the beam would pas through the crystal unaffected. The system therefore acts as a narrow band frequency filter for the incident "signal" beam. The selectivity of this filter depends on the periodic index changes in the Z-direction, thus it depends on the periodicity of the array of electrodes. The selectivity of this filter further depends on the length of the crystal (in the Z direction), and on the average wavelength of the incident "signal" beam. The efficiency of this filter, namely, its ability to reflect light of the desired frequency, depends on three variables: the intensities of signal beam 50, background beam 58, and the applied field E0. When the background 58 intensity and the applied field E0 are set anywhere in the appropriate parameter range that gives rise to the enhancement of the non-linear effects in the crystal, there is efficient self-filtering of the signal beam 50.

Figure 7:
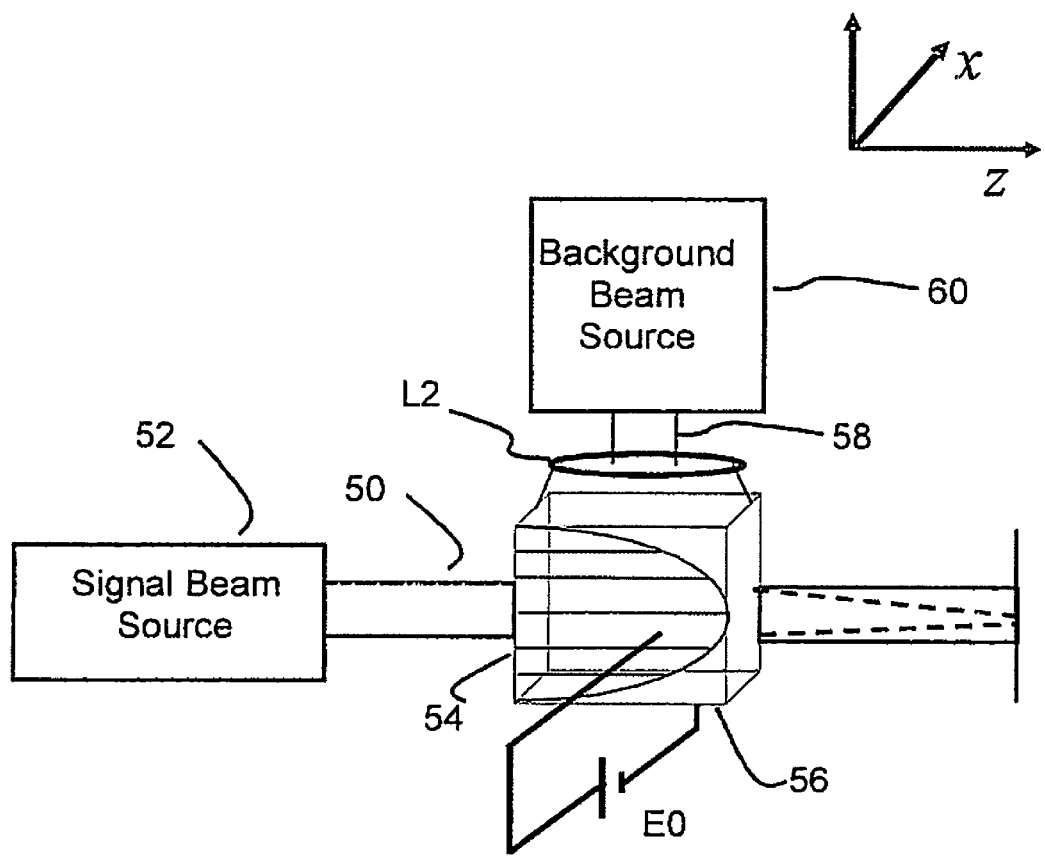
FIG. 7 illustrates a system forming an variable lens throughout the volume of a photorefractive semiconductor, with the lens properties being adjusted by light and electric field, in accordance with a preferred embodiment of the present invention.

FIG. 7 illustrates a system with lens properties, which is achieved by using a photorefractive semiconductor in accordance with a preferred embodiment of the present invention.

The two <X> faces of crystal 54 are connected to a non-uniform bias electric field E0 applied through electrodes 56. The electrodes are in the form of plates with a curved edge: concave or convex.

When E0=0, the refractive index is uniform everywhere in the crystal, and signal beam 50 propagates along the Z direction. When E0>0, it modifies the refractive index of crystal 54. The index change at any point depends on the local field, which in turn depends on the signal 50 and background 58 intensities and whether that point is between electrodes 56 or not (as in regions that are not between electrodes, E0=0).

Hence, the optical intensity and the bias field give rise to a lens-like index change and the beam propagating in the crystal experiences a different refractive index at different "heights" in the Y direction. This creates a quadratic wave front (the same as an ordinary lens) and the beam propagates through it as if it passes through a lens.

Therefore the curvature of the wave front of the beam depends on three variables: the intensities of signal beam 50, background beam 58, and applied field E0. When the background 58 intensity and the applied field E0 are set anywhere in the appropriate parameter range that gives rise to the enhancement of the non-linear effects in the crystal, a self-induced lens results.

Figure 8:
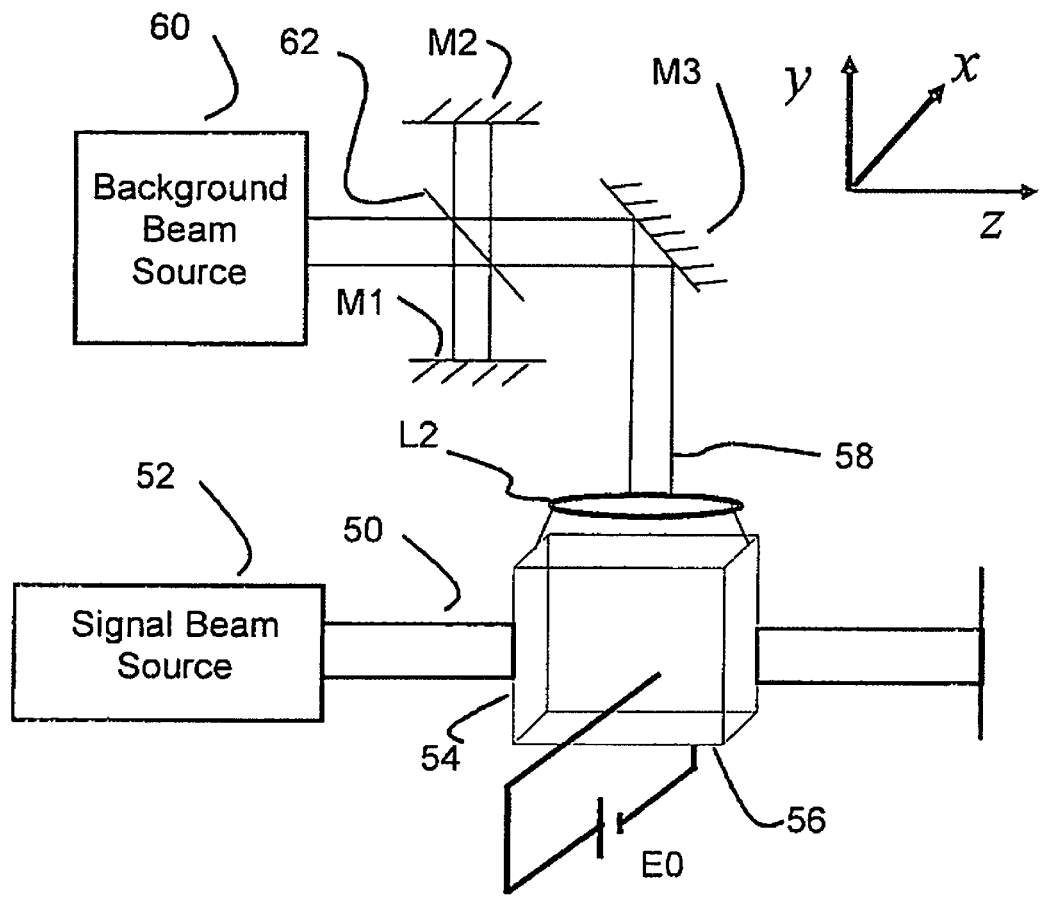
FIG. 8 illustrates a system for creating a photonic crystal effect or self-filtering effect in accordance with an another preferred embodiment of the present invention.

Whereas the photonic lattice (FIG. 5) and self-filtering (FIG. 6) embodiments of the present invention have been described using the applied electric field, these effects can also be accomplished by varying the profile of background beam 60 intensity. This can be done in a number of ways, as is familiar to one skilled in the art. An example of the implementation of varying background beam 60 intensity is now described with reference to FIG. 8.

The two <X> faces of crystal 54 are connected to a uniform bias electric field E0 applied through electrodes 56.

Background beam 58 is launched in beam splitter 62, which splits the beam into two beams, one going to mirror M1 and the other to mirror M2. The mirrors reflect the beams back to splitter 62, which recombines the beams, thereby creating an interference pattern in background beam 58.

The stripes of the interference pattern can be along the <X> direction hence the system is self-filtering or along the <Z> direction hence the system is a photonic crystal.

When E0=0, the refractive index is uniform everywhere in the crystal and signal beam 50 propagates along the <Z> direction. When E0>0, it modifies the refractive index of crystal 54. The index change at any point depends on the local field, which in turn depends on the signal 50 and local background 58 intensities.

Hence, the optical intensity and the bias field give rise to a periodic change (along the <Z> or <X> direction) in the refractive index and the beam propagating in the crystal experiences a different refractive index at different locations. The results are similar to those achieved using periodic electrodes with the same direction of periodicity.

Figure 9:
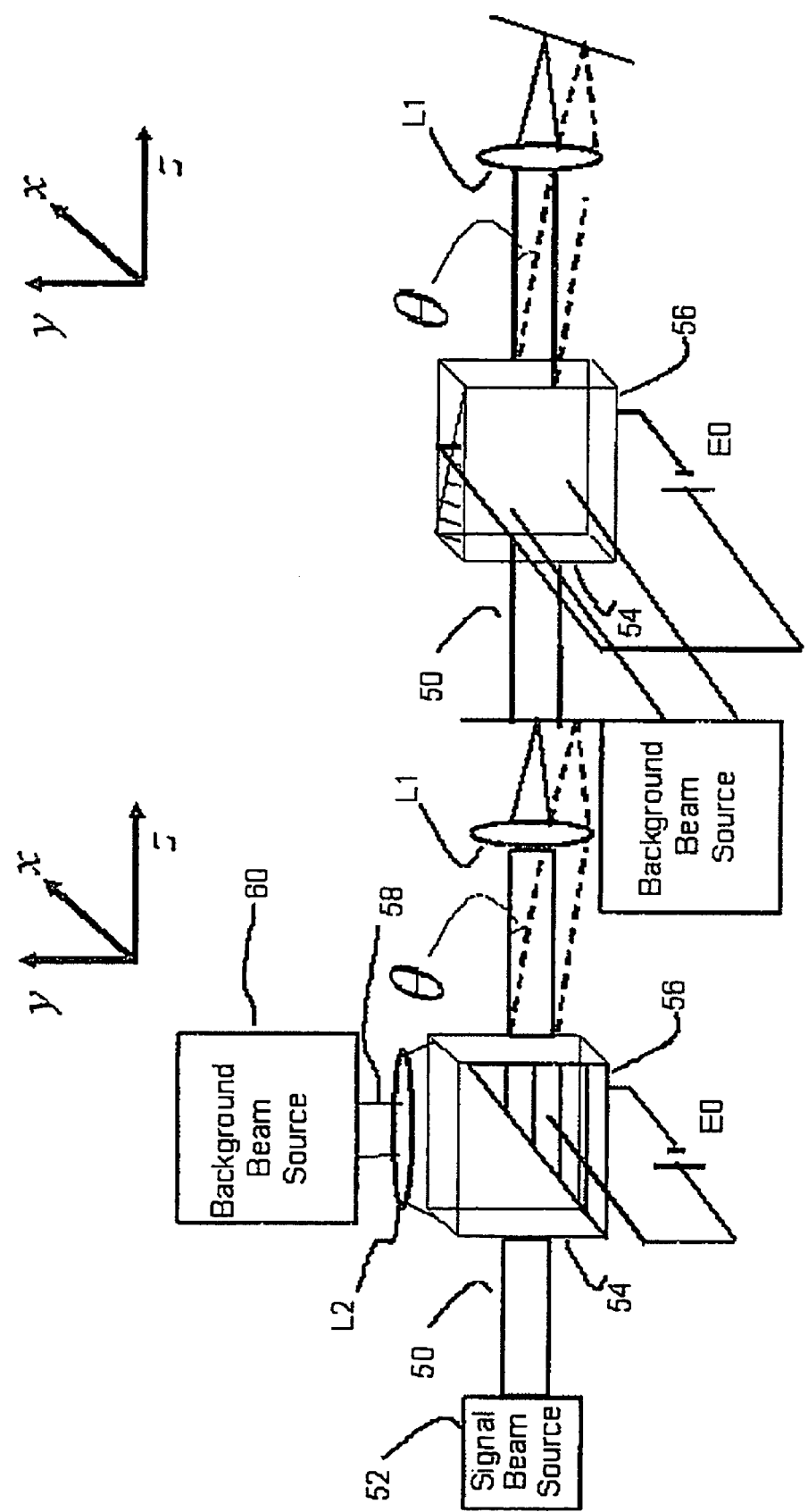
FIG. 9 illustrates a system for beam self-deflection in two directions through concatenated two systems, in accordance with another preferred embodiment of the present invention.

FIG. 9 illustrates a system for beam self-deflection in two dimensions through two concatenated systems (such as the system described in FIG. 1), in accordance with a preferred embodiment of the present invention A "signal" beam 50 from signal beam source 52 with intensity (Is) is launched into a system as described in FIG. 1 and propagates along its Z direction.

The signal beam wave front is tilted in the Y direction by first crystal 54. The tilted output signal beam from crystal 54 is preferably captured by first lens L1, which transforms the angle of the wave front to deflection in the Y direction.

A second similar system, which is tilted 90 degrees in relation to the first system, is concatenated to the first system. The output beam of the first system propagates along the Z direction of the second system and its wave front is tilted in the X direction by second crystal 54. The tilted output signal beam from first and second crystals 54 is preferably captured by second lens L1, which transforms the angle of the wave front to deflection in the X direction.

When E0=0, the refractive index is uniform everywhere in the crystals and signal beam 50 propagates "on axis". When E0>0, it modifies the refractive index of crystals 54. The index change at any point depends on the local field, which in turn depends on the signal 50 and background 58 intensities and whether that point is between electrodes 56 or not (as in regions that are not between electrodes, E0=0).

Therefore the deflection depends on three variables: the intensities of signal beam 50, background beam 58, and applied field E0.

The system deflects the beam in both direction <X> and direction <Y> and the number of resolvable spots is the number of the resolvable spots in the <X> direction multiplied by the number of resolvable spots in the <Y> direction. This number can exceed the value of 729 resolvable spots for the two concatenated systems described hereinabove.

To summarize, the test system whose results are shown in FIG. 2a to FIG. 2f and FIG. 3 demonstrates in photorefractive semiconductor crystal CdZnTe:V a very large self-deflection of an optical beam, deflection of one beam by another beam, and electro-optic beam deflection. The deflection is linear dependence on the intensities of the signal (deflected) beam and the background (control) beam.

These results do not indicate any saturation, although saturation is most likely present at sufficiently large intensities, beyond our tested measurement range. In principle, our self-deflection technique could be further improved to facilitate more than 100 resolvable spots. Packaging the device for higher currents should improve the results considerably, as our present system is limited mostly by "parasitic" surface currents. Furthermore, the triangular electrodes modify the refractive index in only half of the crystal. It should be possible to utilize the other half of the crystal to obtain a refractive index change of opposite sign, thereby doubling the number of resolution points. This can be done by assembling together two different "halves" of this crystal type, cut along different crystalline orientations, and provide each half with a pair of triangular electrodes. Another way to increase the number of resolvable spots is to use longer and wider crystals. Altogether, our current system should be considered as an example of the principle, with potential capabilities that can be at least four times higher, suggesting applications that necessitate a large number of spots, such as laser scanners, printers, interconnects, etc.

In conclusion, the present invention provides large self-deflection, all-optical beam steering, and electro-optic beam defection in photorefractive semiconductors. To our knowledge, this is the largest optical self-deflection ever observed. These effects could be used for various applications, including those requiring high-speed beam steering, as photorefractive effects in such crystals are observed at submicrosecond scales even at low power.

Some examples of applications of the present invention may include the use of the present invention in optical limiters, deflection shielding for protection against high-power electromagnetic radiation, optical switching and interconnects, self-switching for packet switching applications in optical telecommunications, which rely on asynchronous communication, beam steering for optical scanners, beam steering for entertainment purposes, and other applications where deflection of an optical beam is desired.

It should be clear that the description of the embodiments and attached Figures set forth in this specification serves only for a better understanding of the invention, without limiting its scope as covered by the following Claims.

It should also be clear that a person skilled in the art, after reading the present specification could make adjustments or amendments to the attached Figures and above described embodiments that would still be covered by the following claims.

The invention claimed is:

1. An apparatus for deflection of an incident optical beam, the apparatus comprising:
   a photorefractive semiconductor crystal in the path of the incident optical beam, said crystal having embedded dopants therein; and
   a bias electric field generator including electrodes placed on different faces of the crystal, to apply a bias electric field forming one or more regions between the electrodes, each of said one or more regions characterized by an index of refraction which is different than the index of refraction of at least one other region within the crystal, such that at least part of a boundary between a region of said one or more regions and a region of said at least one other region forms an oblique angle with the direction of propagation of the incident beam when passing through the crystal, whereby when the incident beam illuminates the crystal the intensity of the incident beam determines the degree the deflection of the incident beam.

2. The apparatus as claimed in claim 1, wherein each of the electrodes only partially covers the face of the crystal it is placed on.

3. The apparatus as claimed in claim 1, wherein the electrodes are triangular.

4. The apparatus as claimed in claim 1, wherein the electrodes are in the form of plates with a curved edge.

5. The apparatus as claimed in claim 1, wherein the electrodes comprise an electrode array arranged in a periodic arrangement.

6. The apparatus as claimed in claim 1, wherein the crystal is selected from a group of crystals consisting of doped CdZnTe, doped InP, and doped GaAs.

7. The apparatus as claimed in claim 1, wherein the crystal comprises at least two parts, each part with different crystalline orientations.

8. The apparatus as claimed in claim 7, wherein the electrodes comprise at least two pairs of electrodes in opposite polarities, for applying electric fields of opposite polarities on said at least two parts.

9. The apparatus as claimed in claim 1, further comprising control for the bias electric field to vary the bias electric field so as to control the degree the deflection of the incident beam.

10. The apparatus as claimed in claim 1, comprising a background beam to illuminate the crystal at a wavelength range corresponding to absorption levels of the dopants.

11. The apparatus as claimed in claim 10, further comprising intensity control to vary the intensity of the background beam so as to control the degree the deflection of the incident beam.

* * * * *